June 24, 1958 — S. HOLM — 2,840,351
TEMPERATURE EQUALIZING MEANS FOR REGENERATIVE AIR PREHEATER STRUCTURE
Filed Sept. 10, 1953
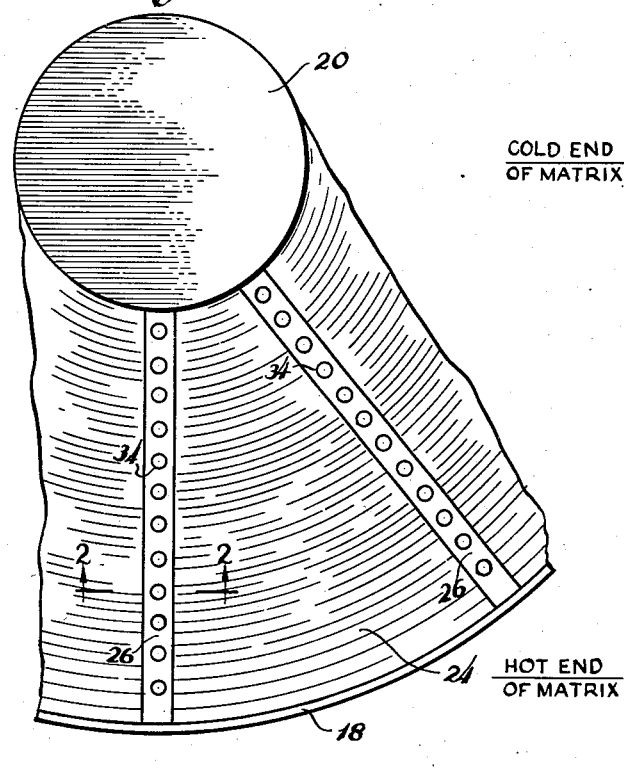
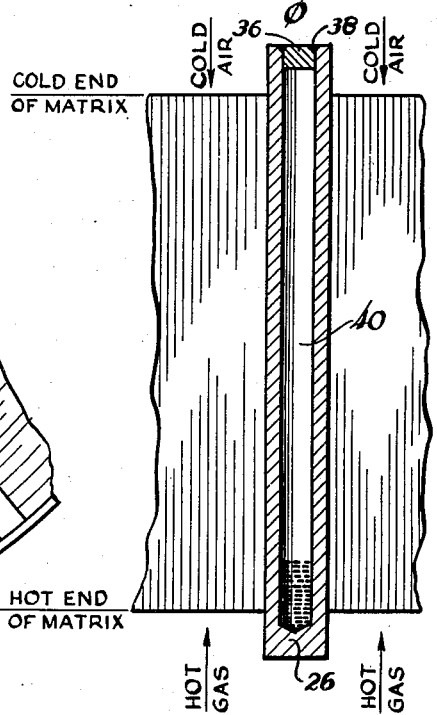
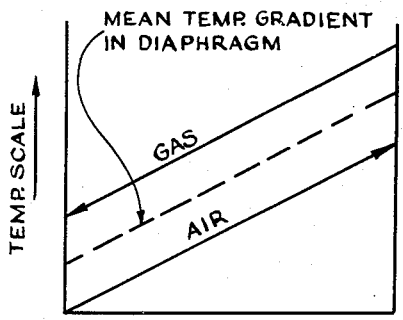
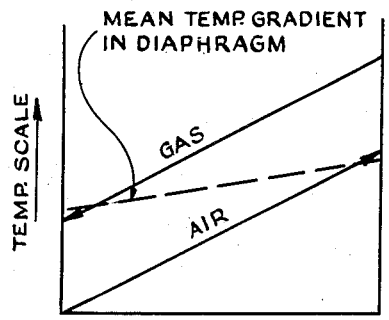
INVENTOR.
Sven Holm June 24, 1958  S. HOLM  2,840,351
TEMPERATURE EQUALIZING MEANS FOR REGENERATIVE
AIR PREHEATER STRUCTURE
Filed Sept. 10, 1953  2 Sheets-Sheet 2

INVENTOR.
Sven Holm
BY
ATTORNEY

United States Patent Office 2,840,351
Patented June 24, 1958

2,840,351

TEMPERATURE EQUALIZING MEANS FOR REGENERATIVE AIR PREHEATER STRUCTURE

Sven Holm, Hudson, Ohio, assignor to The Air Preheater Corporation, New York, N. Y., a corporation of New York Application September 10, 1953, Serial No. 379,337

5 Claims. (Cl. 257—6)

This invention relates to heat exchange apparatus and particularly to an improved rotor construction especially adapted for use in a rotary regenerative air preheater.

In a rotary regenerative air preheater a cylindical rotor has compartments formed by radially positioned diaphragms or partitions which extend outwardly from an axially positioned rotor post to a concentrically aligned rotor shell. The compartments carry heat transfer material which as the rotor turns is first exposed to hot gases to absorb heat therefrom and then exposed to air to impart heat thereto.

In recently developed preheaters of this type, the tendency has been toward the use of highly efficient heat transfer elements in the rotor. As more efficient heat transfer elements are developed, it becomes possible to decrease the overall size of a preheater with the resulting tendency for preheaters now utilizing such elements to have a shallow compact mass of heating elements packed in compartments between shallow partitions.

Since the temperature difference across a rotor of this type is impressed on partitions each having a relatively short flow length axially of the rotor, there is a possibility that there may be an amount of thermal distortion, and a resulting tendency for the entire rotor to be warped and twisted out of shape to an extent sufficient to impair the sealing effect of seals that are positioned between the rotor and the rotor housing and designed to prevent the mingling of hot exhaust gases and the combustion air.

The use of relatively thick steel plates for partitions in an air preheater of this type has been partially successful in reducing the thermal distortion. However, there still remains a high temperature gradient across each partition and a tendency for such partitions to become distorted.

To overcome this undesirable distortion, the present invention contemplates the use of means designed to reduce the temperature gradient within the partitions. This, briefly described comprises the provision of sealed chambers in each partition containing a predetermined quantity of water which when subjected to operational temperatures of the rotor partially vaporizes, thereby subjecting the chamber walls to the temperature of the water or the water vapor. Since the temperature of the water and the water vapor must be equal under such conditions, the temperature of all the chamber walls are maintained at a constant temperature level.

The invention will best be understood upon consideration of the following detailed description of an illustrative embodiment thereof when read in conjunction with the accompanying drawings in which:

Figure 1 is a fragmentary plan view in diagrammatic form of a section of a preheater rotor including two radial partitions separating compartments of the rotor.

Figure 2 is a sectional view of a rotor viewed on line 2—2 of Figure 1.

Figure 3 is a graph illustrating the mean temperature gradient in a partition of a conventional preheater.

Figure 4 grapically illustrates the mean temperature gradient in a partition embodying this invention.

Figure 5:
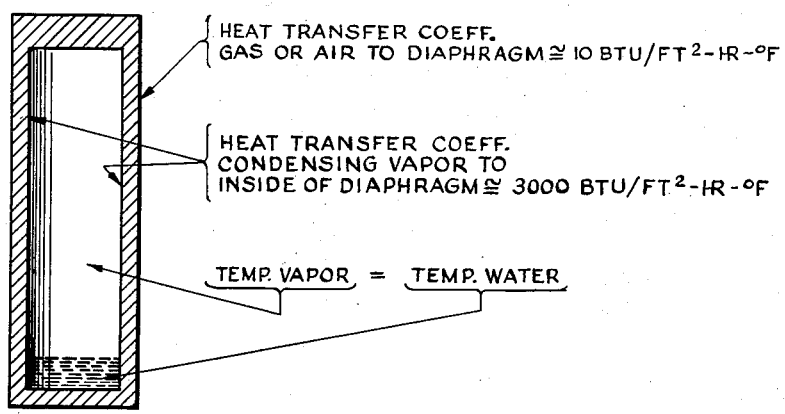

Figure 5 illustrates the temperature equalizing principle embodied in this invention.

Figure 6:
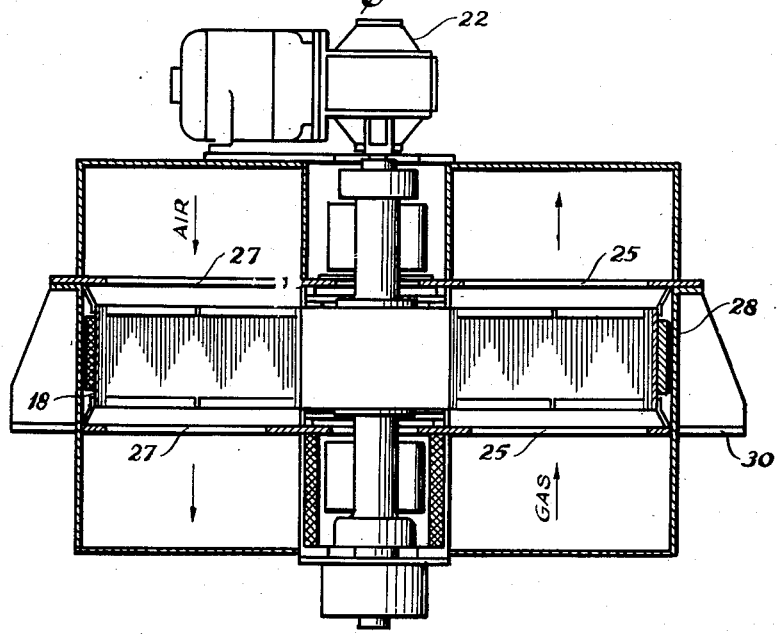

Figure 6 is a sectional elevation of a typical shallow type rotary regenerative air preheater.

In the drawings, the numeral 18 indicates the cylindrical shell of a rotor that is divided into wedge or sector shaped compartments 19 by radial diaphragms or partitions 26 connecting the rotor shell to the rotor post 20. The rotor is rotated slowly about its axis by a motor and reduction gearing 22 (Figure 6) which here is shown geared to the rotor post. The rotor compartments contain regenerative heat transfer material usually in the form of spaced metallic plates which first absorb heat from hot gases entering the preheater from a boiler or other source of supply. Then, as the rotor turns slowly about its axis, the heat exchange material is moved into the stream of air passing in counter current relation therethrough to the opposite side of the rotor. After passing over the surface and absorbing heat therefrom, the stream of heated air is conveyed to a boiler furnace or other place of usage through suitable ductwork. A housing 28 encloses the rotor 24 and is provided at either end with the sector plates 30 apertured at 25 and 27 to permit streams of gas and air to enter and leave the preheater, and flanged to permit the connection of inlet and outlet air and gas ducts.

Heretofore, conventional practice has utilized partitions 26 usually constructed from a solid steel plate extending from the rotor post 20 to the rotor shell 18 and having a depth slightly greater than that of the intervening compartments of heat exchange material, which last comprises the matrix of the rotor in the manner shown in Figure 2.

As a result of the increased efficiency of recently developed heat exchange material for a preheater of this type, a rotor with shallow compartments having the same overall capacity as the older types of deep compartments may be utilized. However, the use of a shallow rotor with shallow partitions may result in excessive thermal distortion of the rotor unless proper precautionary measures are taken to equalize temperatures and prevent such distortion.

In accordance with the invention to decrease the tendency for partitions to be thermally distorted, holes may be drilled in each diaphragm to form chambers 40 in the manner shown by Figures 1 and 2. A predetermined quantity of water is then placed in each hole before it is closed with a plug 36. The plug is preferably welded in place by a continuous seam weld 38 thereby making each chamber 40 a pressure tight chamber extending axially from the hot end to the cold end of the rotor.

The invention is also applicable to the circumferential diaphragms that extend between radial partitions to subdivide the wedge shaped compartments.

As the preheater is placed in operation and its temperature is raised to operational level, the water in each closed chamber 40 partially vaporizes, whereby the temperature of the water and that of the saturated water vapor are maintained equal. Thus there is provided a constant temperature throughout the chamber 40 and a nearly constant temperature extending axially of the partition 26 from the hot end to the cold end of the rotor. As is illustrated in Figure 5, the basic principle on which this temperature equalizing means depends is that in a saturated condition, the temperature of the water vapor equals the temperature of the water, and that the heat transfer coefficienet of the saturated vapor to the chamber wall inside the diaphragms is approximately 3000 B. t. u./ft.$^2$-hr.-° F. while the comparative heat transfer coefficient of gas or air to the outer diaphragm surface is but 10 B. t. u./ft.$^2$-hr.-° F. The high heat transfer coefficient at the inner surface of the chamber permits the heat of the vapor to be readily transmitted into the metal chamber walls at the cold end of the partition 26. The resulting mean temperature gradient across a chambered partition is diagrammatically illustrated at Figure 4 of the drawing. Here the mean temperature gradient is shown to be nearly constant as compared with the varying mean temperature gradient of a conventional diaphragm as illustrated in Figure 3.

Since the temperature gradient within each chambered diaphragm of the type herein disclosed is but a fraction of the temperature gradient impressed across each conventional diaphragm, the distortion due to variations in expansion at different temperature levels is substantially eliminated. With little or no distortion of the diaphragms, the sealing members that are provided to preclude fluid flow between relatively movable members efficiently perform their intended function of preventing the mingling of hot exhaust gases and combustion air.

Chambered diaphragms of the type herein disclosed may be built up from composite channel members or from spaced plates having sealed channels therebetween and it is to be understood that such and other structural variations and modifications are intended to lie entirely within the scope of this invention.

What I claim is:

1. In a regenerative air preheater having a rotor internally divided into compartments containing a mass of heat transfer material exposed alternately to streams of hot gases and relatively cool air; the improvement comprising: partitions in the rotor creating said compartments and formed with a plurality of internal chambers lying parallel to the streams of gas and air; a body of vaporizable fluid occupying less than the volume of each chamber; and means sealing said chambers whereby in the operation of said preheater fluid in said chambers becomes vaporized so that said chambers contain a saturated vapor.

2. A preheater rotor as recited in claim 1 wherein the partitions and the chambers therein extend axially beyond the heat exchange mass in said compartments.

3. In a regenerative air preheater having a cylindrical rotor internally divided into wedge shaped compartments containing heat transfer material exposed alternately to streams of hot gases and relatively cool air flowing in countercurrent relation; the improvement comprising: radial partitions in the rotor creating said compartments and formed with a plurality of chambers extending axially of the rotor and parallel to the streams of gas and air flowing therethrough; a predetermined quantity of vaporizable fluid contained in each chamber in volumetric amount less than the volume of said chamber; and means sealing said chambers, whereby in the operation of said preheater fluid in said chambers vaporizes so that said chambers contain a saturated vapor acting to equalize the temperature gradient axially of said partitions.

4. In a rotary regenerative air preheater having a rotor comprising a rotor post connected to a circular rotor shell by radial partitions that divide the interior of the rotor into sector shaped compartments carrying a mass of heat exchange material for the flow of heat interchange fluids therethrough; means forming in said partitions a series of closed chambers extending generally axially of the rotor and parallel to the flow of heat interchange fluids and a body of water occupying part of the volume of said chamber to provide means equalizing the temperature gradient across each partition in the direction of flow of the heat interchange fluids.

5. A rotary regenerative air preheater having a rotor comprising an axially positioned rotor post connected to a concentrically aligned rotor shell by radial partitions that divide the interior of the rotor into sector shaped compartments; a mass of heat exchange material positioned in each sector shaped compartment between radial partitions, said radial partitions comprising plate members having a series of totally enclosed chambers extending generally axially of the rotor in the direction of fluid flow; and a predetermined quantity of water enclosed in each chamber sufficient to provide a saturated vapor therein when raised to operational temperature.

References Cited in the file of this patent

UNITED STATES PATENTS

| 1,690,108 | Grady | Nov. 6, 1928 |

FOREIGN PATENTS

| 108,740 | Austria | Jan. 25, 1928 |
| 670,509 | France | Nov. 29, 1929 |
| 665,299 | Great Britain | Jan. 23, 1952 |
| 1,018,902 | France | Jan. 14, 1953 |